(12) United States Patent
Sundar et al.

(10) Patent No.: US 8,437,263 B2
(45) Date of Patent: May 7, 2013

(54) TRACING AN ACCESS POINT IN A WIRELESS NETWORK

(75) Inventors: Jagane D. Sundar, Saratoga, CA (US);
Chia-Chee Kuan, Los Altos, CA (US);
Miles Wu, Fremont, CA (US)

(73) Assignee: Airmagnet, Inc.

( * ) Notice: Subject to any disclaimer, the term of this patent is extended or adjusted under 35 U.S.C. 154(b) by 1364 days.

(21) Appl. No.: 11/373,397

(22) Filed: Mar. 9, 2006

(65) Prior Publication Data

US 2006/0209700 A1    Sep. 21, 2006

Related U.S. Application Data

(60) Provisional application No. 60/660,726, filed on Mar. 11, 2005.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 29/06 | (2006.01) |
| G06F 12/14 | (2006.01) |
| G06F 12/16 | (2006.01) |
| G08B 23/00 | (2006.01) |

(52) U.S. Cl.
USPC ............. 370/248; 370/351; 713/160; 726/22

(58) Field of Classification Search ........................ None
See application file for complete search history.

(56) References Cited

U.S. PATENT DOCUMENTS

| | | | | |
|---|---|---|---|---|
| 6,990,428 | B1* | 1/2006 | Kaiser et al. | 702/150 |
| 7,062,782 | B1* | 6/2006 | Stone et al. | 726/22 |
| 7,236,460 | B2* | 6/2007 | Wu et al. | 370/241 |
| 2004/0111636 | A1* | 6/2004 | Baffes et al. | 713/201 |
| 2005/0030929 | A1* | 2/2005 | Swier et al. | 370/338 |
| 2006/0146813 | A1* | 7/2006 | Biswas et al. | 370/389 |
| 2006/0200862 | A1* | 9/2006 | Olson et al. | 726/23 |
| 2008/0101283 | A1* | 5/2008 | Calhoun et al. | 370/328 |

* cited by examiner

*Primary Examiner* — Xavier Szewai Wong
(74) *Attorney, Agent, or Firm* — Edwards Wildman Palmer LLP; Scott D. Wofsy; Christopher J. Capelli

(57) ABSTRACT

An access point in a wireless network is traced by sending an internet protocol (IP) packet from a detector to the access point through the wireless network. The detector and the access point are connected through a private wired network. The IP packet is sent with the source IP address field and the destination IP address of the IP packet set to the wireless IP address and wired IP address, respectively, of the detector. The IP packet is routed back to the detector through a switch in the private wired network. When the IP packet is received at the detector, a source IP address, which corresponds to the port on the switch used to send the IP packet, is determined from the received IP packet.

30 Claims, 3 Drawing Sheets

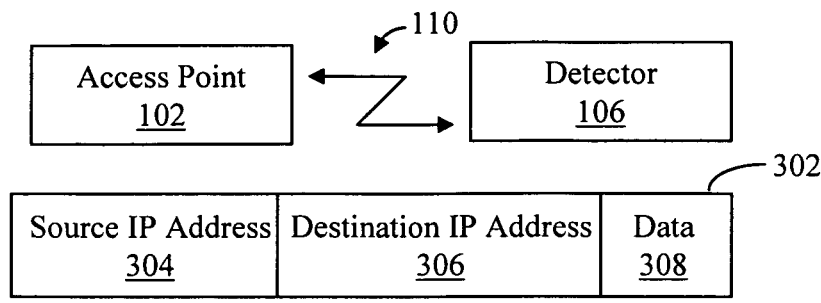
FIG. 3-A
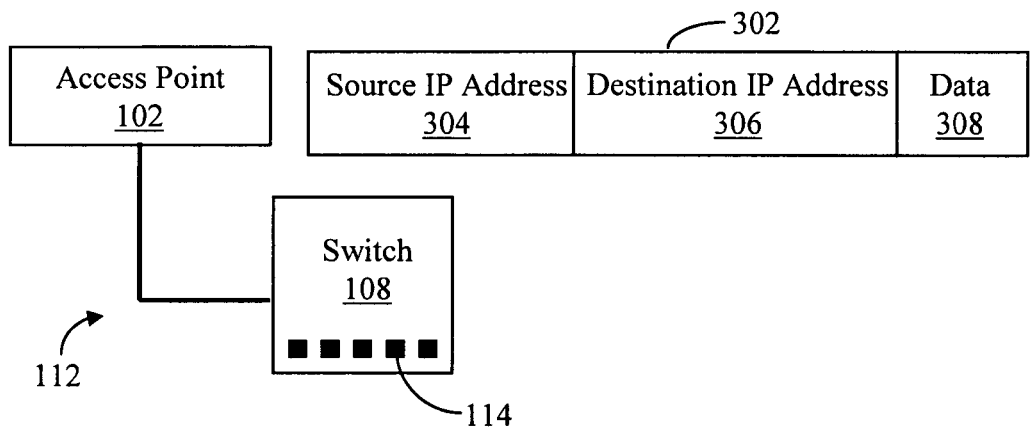
FIG. 3-B
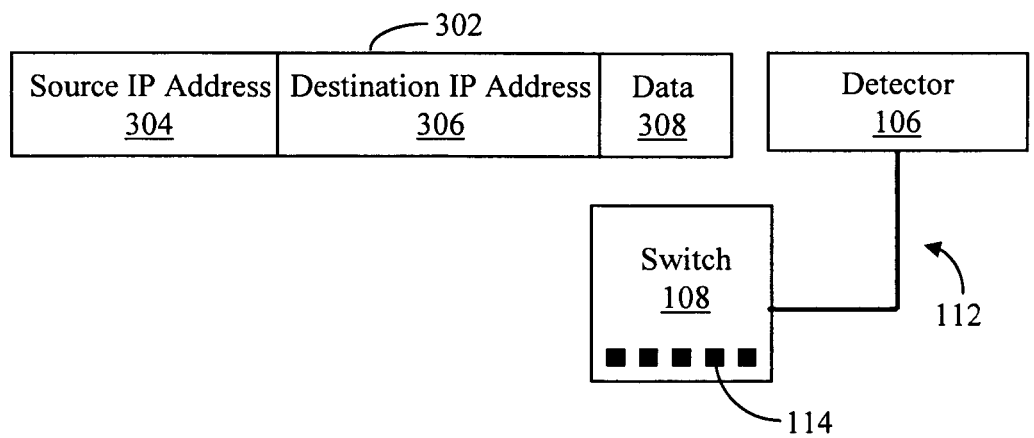
FIG. 3-C

TRACING AN ACCESS POINT IN A WIRELESS NETWORK

CROSS REFERENCE TO RELATED APPLICATION

This application claims the benefit of U.S. Provisional Application No. 60/660,726, filed Mar. 11, 2005, which is incorporated herein by reference in its entirety for all purposes.

BACKGROUND

1. Field

The present application relates to wireless networks, and more particularly to tracing an access point in a wireless network.

2. Related Art

Computers have traditionally communicated with each other through wired networks. However, with the increased demand for mobile computers such as laptops, personal digital assistants, and the like, wireless networks have developed as a way for computers to communicate with each other through transmissions over a wireless medium using radio signals, infrared signals, and the like.

In order to promote interoperability of wireless networks with each other and with wired networks, the IEEE 802.11 standard was developed as an international standard for wireless networks. Generally, the IEEE 802.11 standard was designed to present users with the same interface as an IEEE 802 wired network, while allowing data to be transported over a wireless medium.

In accordance with the current IEEE 802.11 standard, stations associate with an access point through a wireless network to receive service from the access point. Once the stations are associated with the access point, the access point facilitates communication between the stations in the wireless network. The access point can also be connected to a wired network to allow communication between the wired network and the wireless network.

The open architecture of a wireless network, however, can pose some security risks. For example, an unauthorized access point (also referred to as counterfeit or rogue access point) can be connected to a private wired network and operated in a wireless network without the knowledge of the network administrator of the private wired network. Once connected to the private wired network, the unauthorized access point poses as an authorized access point in the wireless network. Stations in the wireless network may mistakenly associate with the unauthorized access point, and then send confidential information to the unauthorized access point, without knowing that the unauthorized access point is not secure. Additionally, the unauthorized access point may fail to enforce any user authentication, which can permit an intruder to penetrate into the private wired network using a station to associate with the unauthorized access point. If the unauthorized access point can be traced, the unauthorized access point can be disconnected or disabled from the private wired network.

SUMMARY

In one exemplary embodiment, an access point in a wireless network is traced by sending an internet protocol (IP) packet from a detector to the access point through the wireless network. The detector and the access point are connected through a private wired network. The IP packet is sent with the source IP address field and the destination IP address of the IP packet set to the wireless IP address and wired IP address, respectively, of the detector. The IP packet is routed back to the detector through a switch in the private wired network. When the IP packet is received at the detector, a source IP address, which corresponds to the port on the switch used to send the IP packet, is determined from the received IP packet.

DESCRIPTION OF DRAWING FIGURES

The present application can be best understood by reference to the following description taken in conjunction with the accompanying drawing figures, in which like parts may be referred to by like numerals:

Figure 1:
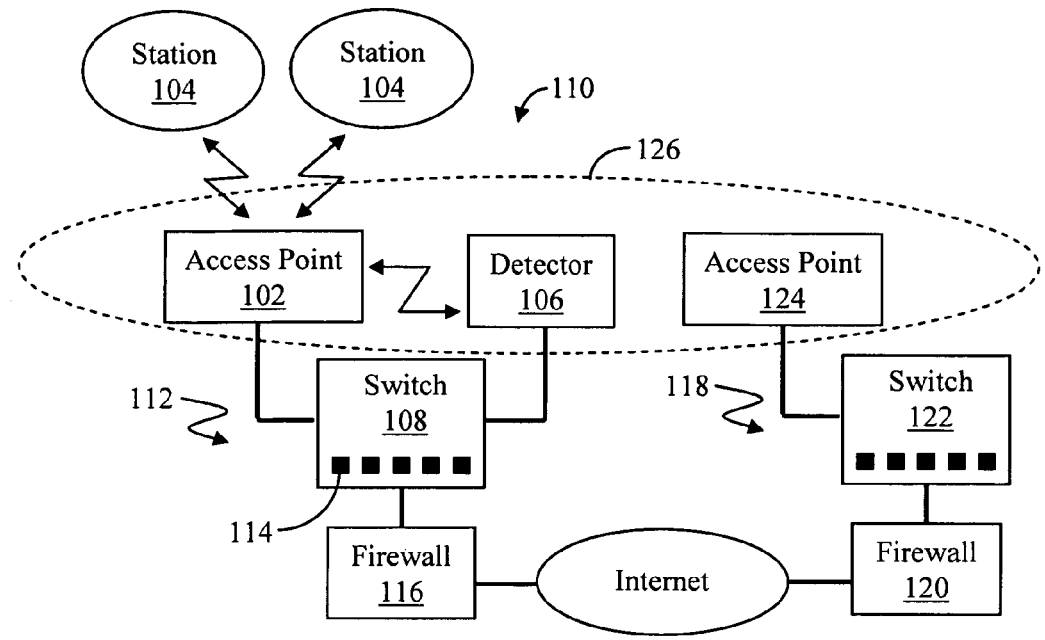
FIG. 1 is a block diagram of an exemplary of a system to trace an access point in a wireless network.
Figure 4:
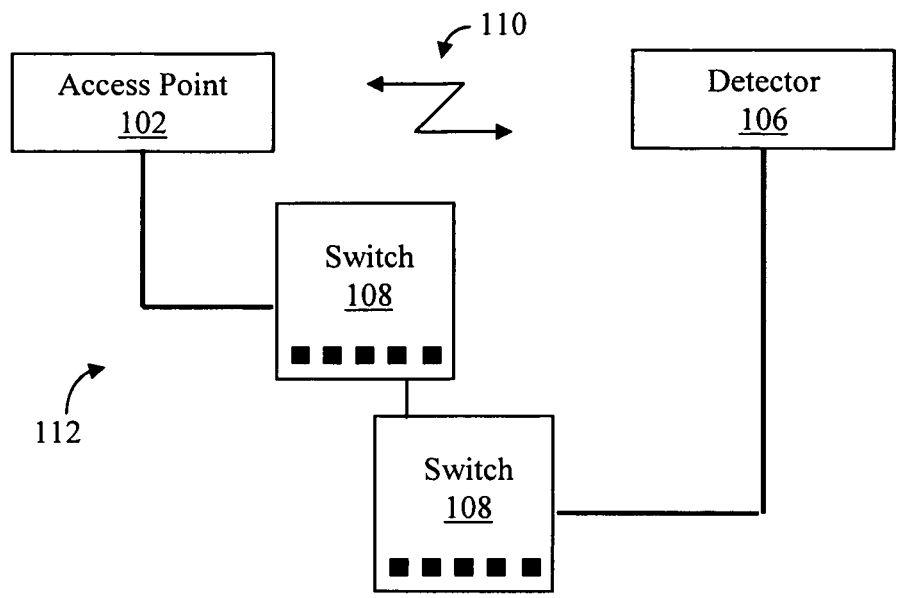
Figure 5:
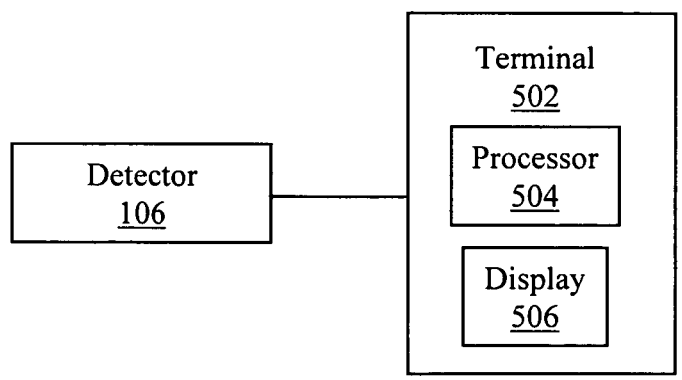

FIG. 3-A depicts a portion of FIG. 1;

FIG. 3-B depicts another portion of FIG. 1;

FIG. 3-C depicts another portion of FIG. 1;

FIG. 4 is a block diagram of another exemplary embodiment of a system to trace an access point; and FIG. 5 is a block diagram of an exemplary terminal connected to an exemplary detector.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

With reference to FIG. 1, in accordance with the IEEE 802.11 standard, an access point (AP) 102 communicates with any number of stations 104 through a wireless network 110, such as by sending a radio or infrared signal between wireless transmitters and receivers. A station 104 is a wireless device that can be used to connect to wireless network 110, which can be mobile, portable, stationary, and the like, and can be referred to as the network adapter or network interface card. For instance, a station 104 can be a laptop computer, a personal digital assistant, and the like. In addition, a station 104 can support station services such as authentication, deauthentication, privacy, delivery of data, and the like.

AP 102 can support station services, as described above, and can additionally support distribution services, such as association, disassociation, distribution, integration, and the like. In particular, AP 102 can facilitate communication between wireless devices, such as any two stations 104, through wireless network 110. Under the current IEEE 802.11 standard, to receive service from AP 102, a station 104 must be associated with AP 102 through wireless network 110.

AP 102 can also operate as a bridge between wireless network 110 and a wired network. In particular, FIG. 1 depicts AP 102 connected to a port 114 on a switch 108 in a private wired network 112. It should be recognized that private wired network 112 is "private" in the sense that access to private wired network 112 is secured. In contrast, access to a public wired network, such as the Internet, is not secured.

As depicted in FIG. 1, access to private wired network 112 is typically secured using a firewall 116 connected to switch 108. In particular, firewall 116 controls access to private wired network 112 from the Internet, which is a public wired network in which data access is not secured. It should be recognized that any number of intermediate connections can exist between private wired network 112 and the Internet. For example, private wired network 112 is typically connected to the Internet through an Internet Service Provider (ISP).

As noted above, AP 102 may be an unauthorized AP (also referred to as a counterfeit or rogue AP). As also noted above, an unauthorized AP can pose a security risk. For example, stations 104 in wireless network 110 may mistakenly associate with the unauthorized AP, and send confidential information to the unauthorized AP, without knowing that the unauthorized AP is not secure. The unauthorized AP may also expose private wired network 112 to intruders by failing to enforce user authentication.

Figure 2:
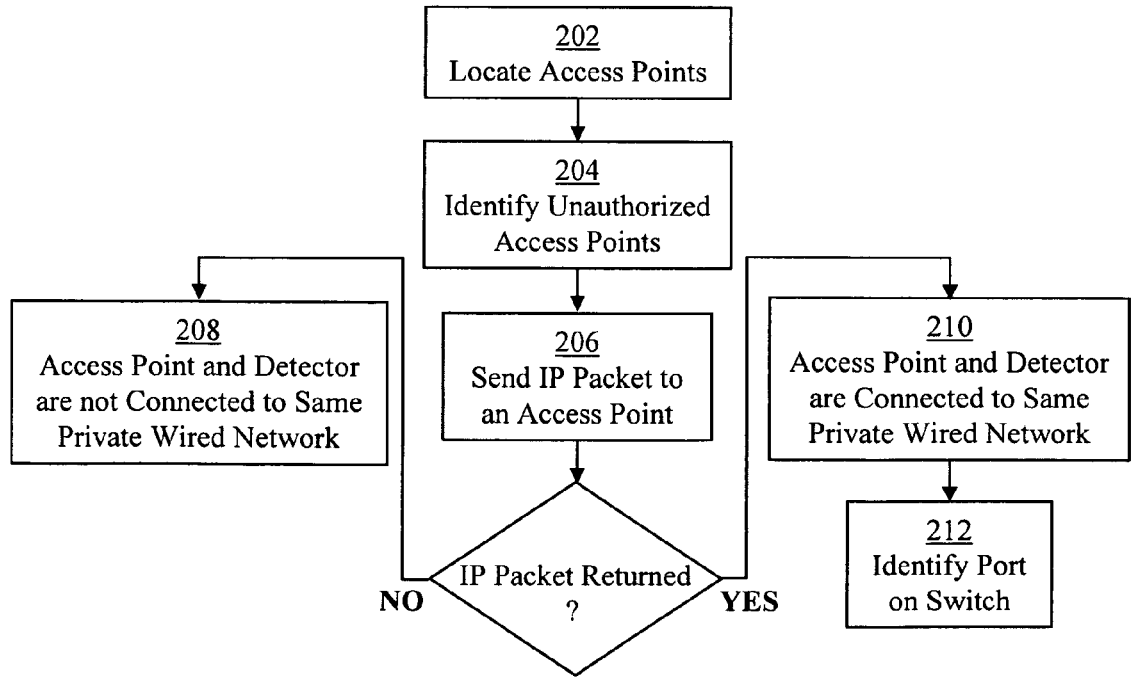
FIG. 2 is flow chart of an exemplary process to trace an access point.

Thus, in one exemplary embodiment, a detector 106 can be used to trace an AP in a wireless network. With reference to FIG. 2, an exemplary process for tracing an AP is depicted. It should be recognized that the exemplary process depicted in FIG. 2 can be performed using software and/or hardware.

In step 202, a detector is used to locate APs in the wireless network. In particular, with reference to FIG. 1, detector 106 can scan for beacon frames, which are transmitted by APs, to locate APs within transmission range 126. Alternatively or additionally, detector 106 can sent probe requests, which are responded to by APs, to locate APs within transmission range 126. For purpose of example, with reference to FIG. 1, assume detector 110 locates APs 102 and 124 within transmission range 126.

With reference to FIG. 2, in step 204, unauthorized APs are identified among any of the APs located in step 202. In particular, identification data (e.g., service set identification addresses (SSID), medium access control (MAC) address, and the like) of the APs located in step 202 can be compared to those of authorized APs to identify unauthorized APs. For example, with reference to FIG. 1, assume that the MAC addresses of APs 102 and 124 are compared with those of authorized APs, such as a list of MAC addresses of authorized APs maintained by the network administrator. For purpose of example, assume APs 102 and 124 are identified as being unauthorized APs. For additional descriptions of an exemplary process of detecting an unauthorized AP, see U.S. patent application Ser. No. 10/112,402, filed on Mar. 29, 2002, which is incorporated herein by reference in its entirety.

With reference to FIG. 2, in step 206, an IP packet is sent to an AP identified as an unauthorized AP in step 204 through the wireless network. For example, with reference to FIG. 3-A, an IP packet 302 is sent from detector 106 to AP 102 through wireless network 110 using user datagram protocol (UDP). As depicted in FIG. 3-A, IP packet 302 includes a source IP address field 304 and a destination IP address field 306. Before IP packet 302 is sent, source IP address field 304 is set to the wireless IP address of detector 106, and destination IP address field 306 is set to the wired IP address of detector 106. In some configurations of wireless network 110, when detector 106 associates with AP 102 to send IP packet 302 to AP 102, the wireless IP address of detector 106 is assigned to detector 106 by AP 102 using dynamic host configuration protocol (DHCP).

With reference to FIG. 1, in the present example, because AP 124 was also identified as being an unauthorized AP, detector 106 also sends an IP packet to AP 124 from detector 106 through wireless network 110. In some configurations of wireless network 110, when detector 106 associates with AP 124 to send the IP packet to AP 124, the wireless IP address of detector 106 is assigned to detector 106 by AP 124 using DHCP. Thus, the IP address in the source IP address field of the IP packet sent to AP 124 may be different than the IP address in the source IP address field of the IP packet sent to AP 102.

With reference to FIG. 2, in step 208, if the IP packet sent in step 206 is not returned to the detector through the private wired network, then the AP to which the IP packet was sent in step 206 is determined to be not connected to the same private wired network as the detector. For example, with reference to FIG. 1, AP 124 is not connected to the same private wired network as detector 106. In particular, AP 124 is connected to private wired network 118 through switch 122, while detector 106 is connected to private wired network 112 through switch 108. As depicted in FIG. 1, firewall 120 controls access to private wired network 118, and firewall 116 controls access to private wired network 112. Thus, although private wired networks 118 and 112 are connected through the Internet, firewall 120 and/or firewall 116 can prevent the IP packet, which was sent from detector 106 to AP 124 through wireless network 110, from being returned to detector 106.

With reference to FIG. 2, in step 210, if the IP packet sent in step 206 is returned to the detector through the private wired network, then the AP to which the IP packet was sent in step 206 is determined to be connected to the same private wired network as the detector. For example, with reference to FIG. 1, AP 102 and detector 106 are connected to the same wired network. Thus, the IP packet, which was sent from detector 106 to AP 102, is returned to detector 106.

With reference to FIG. 2, in step 212, when the IP packet is returned to the detector through the private wired network, a port on a switch used to route the IP packet back to the detector is identified. In particular, with reference to FIG. 3-B, when AP 102 receives IP packet 302, because destination IP address field 304 was set to the wired IP address of detector 106 (FIG. 3-A), AP 102 sends IP packet 302 to switch 108 in private wired network 112. With reference to FIG. 3-C, when switch 108 receives IP packet 302, switch 108 sends IP packet 302 to detector 106 through private wired network 112. Thus, IP packet 302 is routed from AP 102 (FIG. 3-A) back to detector 106 through switch 108 in private wired network 112. In particular, as depicted in FIG. 3-B, IP packet 302 is routed through a port 114 on switch 108 to which AP 102 is connected.

With reference to FIG. 3-C, in one exemplary embodiment, to identify port 114 on switch 108, a source IP address, which corresponds to port 114, is determined from IP packet 302. In particular, when IP packet 302 is received at detector 106, source IP address field 304 of IP packet 302 is examined. The IP address in source IP address field 304 is the source IP address, which corresponds to port 114 on switch 108 used to route IP packet 302 back to detector 106.

For example, with reference to FIG. 3-A, assume that detector 106 has a wireless IP address of "111.222.3.4" and a wired IP address of "111.222.4.5." Thus, source IP address field 304 of IP packet 302 is set to "111.222.3.4," and destination IP field 306 is set to "111.222.4.5." With reference to FIG. 3-B, when IP packet 302 is received at AP 102, IP packet 302 is sent from AP 102 to switch 108. With reference to FIG. 3-C, when IP packet 302 is received at switch 108, IP packet 302 is sent from switch 108 to detector 106 through the port to which AP 102 (FIG. 3-B) is connected. When IP packet 302 is received at detector 106, source IP address field 304 of IP packet 302 can be examined to determine that the source IP address is "111.222.3.4," which can be used to query switch 108 to identify the port on switch 108 that was used to send IP packet 302.

In particular, for the sake of example, assume that switch 108 is a switch compliant with switches manufactured by Cisco Systems, Inc. of San Jose, Calif. (i.e., a Cisco compliant switch). Switch 108 can be queried by logging into switch 108. With reference to FIG. 3-B, AP 102 connected to port 114 on switch 108 is then pinged using the source IP address with the command, "ping 111.222.3.4." The MAC address of the device associated with the source IP address can be determined by issuing an Address Resolution Protocol (ARP) command, "show arp." A MAC address table can be obtained by issuing the command, "show mac-address-table." The port on switch 108 associated with the MAC address can be identified from the MAC address table.

In the present exemplary embodiment, when the port on switch 108 has been identified, a determination can be made as to whether the port is an uplink port to another switch. For example, if there are multiple MAC addresses associated with the port in the MAC address table, then the port is an uplink port to another switch. Also, assuming again that switch 108 is a Cisco complaint switch, information about the devices connected to the ports of switch 108 can be obtained using the Cisco Discovery Protocol (CDP) command, "show cdp neighbor."

If the port on switch 108 is not an uplink port, the port is determined to be connected to AP 102. If the port on switch 108 is determined to be an uplink port, then the port is connected to another switch 108, and the process described above for querying switch 108 is repeated.

For example, with reference to FIG. 4, assume that AP 102 is connected to a first switch 108, which is connected to a second switch 108, which is in turn connected to detector 106. Thus, when AP 102 receives the IP packet from detector 106 through wireless network 110, AP 102 sends the IP packet directly to the first switch 108. When the first switch 108 receives the IP packet from AP 102, the first switch 108 sends the IP packet to the second switch 108. When the second switch 108 receives the IP packet from the first switch 108, the second switch 108 sends the IP packet directly to detector 106.

In this context, the term "directly" refers to the IP packet being sent from AP 102 to the first switch 108 and from the second switch 108 to detector 106 without being relayed through another switch 108. It should be noted, however, that the IP packet can be transmitted through any number and type of networks devices other than a switch 108. Because the IP packet is sent directly from the second switch 108 to detector 106, the second switch 108 is also referred to as the "last-hop switch."

When detector 106 receives the IP packet from the second switch 108, the source IP address is determined from the received IP packet. The source IP address is then used to identify the port on the second switch 108 used to send the IP packet directly to detector 106. Because the second switch 108 is connected to the first switch 108, the source IP address is then used to identify the port on the first switch 108 used to send the IP packet to the second switch 108. Because the first switch 108 is directly connected to AP 102, the port on the first switch 108 is identified as the port connected to AP 102. Thus, if AP 102 is an unauthorized AP, AP 102 can be either disconnected or disabled.

Although FIG. 4 depicts only two switches 108, it should be recognized that any number of switches 108 can be connected between AP 102 and detector 106. Thus, the process described above for tracing through the first and second switches 108 can be used to trace through any number of switches 108 to identify the port on the switch that is directly connected to AP 102. Again, in the present context, "directly connected" refers to AP 102 being connected to a switch without any intermediate switches, but any number and type of network devices may be connected between AP 102 and the switch.

It should be recognized that various techniques, including commands other than those specified above, can be used to query a switch to identify a port on the switch associated with the source IP address. It should also be recognized that the switch can be a non-Cisco compliant switch, and that commands equivalent to those specified above can be used to query a non-Cisco compliant switch to identify a port on the switch associated with the source IP address. For example, the switch can be queried using simple network management protocol (SNMP).

With reference again to FIG. 3-A, as described above, in one exemplary embodiment, when IP packet 302 is sent from detector 106 to AP 102 through wireless network 110, source IP address field 304 is set to the wireless IP address of detector 106, which in the example described above was "111.222.3.4." With reference to FIG. 3-C, as also described above, in one exemplary embodiment, when IP packet 302 is received at detector 106, source IP address field 304 is examined to determine the source IP address, which in the example described above was "111.222.3.4." Thus, in the example described above, source IP address field 304 of IP packet 302 was not altered as IP packet 302 was routed through AP 102 (FIG. 3-A) and switch 108.

With reference to FIG. 3-A, in another exemplary embodiment, AP 102 can be configured to perform network address translation (NAT). In particular, in accordance with the IEEE.802.11 standard, when AP 102 sends IP packet 302 to switch 108, AP 102 can replace the IP address in source IP address field 304 with the IP address of AP 102. Thus, with reference to FIG. 3-C, when IP packet 302 is received at detector 106, the IP address in source IP address field 304 of IP packet 302 is that of AP 102 rather than the wireless IP address of detector 106.

Thus, with reference again to FIG. 3-A, in one exemplary embodiment, in addition to setting source IP address field 304 to the wireless IP address of detector 106, the wireless IP address of detector 106 is copied into a data field 308 of IP packet 302. With reference to FIG. 3-C, when IP packet 302 is received at detector 106, the IP address in source IP address field 304 is compared to the IP address in data field 308. If the IP addresses are the same, then AP 102 is not performing NAT. However, if the IP addresses are different, then AP 102 is performing NAT.

As noted above, it should be recognized that the exemplary processes described above can be performed using software and/or hardware. It should also be recognized that the appropriate software and/or hardware can be installed on detector 106. Alternatively, with reference to FIG. 5, the appropriate software and/or hardware can be divided between detector 106 and a terminal 502, which communicates with detector 106.

For example, as depicted in FIG. 5, terminal 502 can include a processor 504 configured to perform all or a portion of the various operations of the processes described above, while detector 106 can include appropriate software and/or hardware interfaces to communicate with wireless network 110 (FIG. 1) and private wired network 112 (FIG. 1). Terminal 502 can also include a display 506 used to display results to a user.

It should be recognized, however, that detector 106 and terminal 502 can be configured as a single unitary device. It should also be recognized that detector 106 and terminal 502 can be used by a user, such as a network administrator, to monitor and/or maintain wireless network 110 (FIG. 1) and private wired network 112 (FIG. 1).

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching.

We claim:

1. A method of tracing an access point in a wireless network, the method comprising:
    setting a source internet protocol (IP) address field of an IP packet to a wireless IP address of a detector associated with the access point through the wireless network, wherein the detector and the access point are connected through a private wired network;
    setting a destination IP address field of the IP packet to a wired IP address of the detector;
    sending the IP packet from the detector to the access point through the wireless network,
    routing the IP packet from the access point back to the detector through a switch in the private wired network;
    receiving the routed IP packet at the detector; and
    determining whether a source IP address is the wireless IP address of the detector from the received IP packet;
    identifying a port on the switch used to route the IP packet back to the detector by analyzing a source IP address field from the received IP packet, if the source IP address is the wireless IP address of the detector.

2. The method of claim 1, wherein routing the IP packet further comprises: relaying the IP packet through a set of one or more switches in the private wired network.

3. The method of claim 2, further comprising:
    tracing through the set of one or more switches to identify the port on the switch to which the access point is connected using the source IP address determined from the received IP packet.

4. The method of claim 3, wherein one of the set of one or more switches is a last-hop switch, which sends the IP packet to the detector without relaying the IP packet through another switch, and wherein tracing through the set of one or more switches comprises:
    identifying a port on the last-hop switch that was used to send the IP packet to the detector using the source IP address;
    determining if the port on the last-hop switch is connected to another switch; and if the port is connected to another switch:
    a) identifying a port on that switch;
    b) determining if the port identified in a) is connected to yet another switch; and
    c) repeating a) and b) until a port is identified that is not connected to another switch, wherein the port that is not connected to another switch is the port on the switch that is connected to the access point.

5. The method of claim 1, further comprising:
    before the IP packet is sent from the detector to the access point through the wireless network, copying the wireless IP address of the detector into a data field of the IP packet; and
    when the IP packet is received at the detector, comparing the source IP address field of the IP packet to the wireless IP address in the data field of the IP packet,
    wherein if the source IP address field and the wireless IP address are the same, the IP packet was not network address translated, and
    wherein if the source IP address field and the wireless IP address are not the same, the IP packet was network address translated.

6. A method of tracing an access point in a wireless network, the method comprising:
    setting a source internet protocol (IP) address field of an IP packet to a wireless IP address of a detector associated with the access point through the wireless network, wherein the detector and the access point are connected through a private wired network;
    setting a destination IP address field of the IP packet to a wired IP address of the detector;
    sending the IP packet from the detector to the access point through the wireless network, wherein the IP packet is routed form the access point back to the detector through a switch in the wired network;
    receiving the IP packet at the detector; and
    determining whether a source IP address is the wireless IP address of the detector from the received IP packet,
    identifying a port on the switch used to routed the IP packet back to the detector by analyzing a source IP address field from the received IP packet, if the source IP address is the wireless IP address of the detector.

7. The method of claim 6, wherein determining a source IP address comprises:
    examining the source IP address field of the IP packet received at the detector to obtain the source IP address.

8. The method of claim 6, wherein the access point is connected to the port on the switch without being connected through another switch, and further comprising:
    identifying the port on the switch to which the access point is connected using the source IP address determined from the received IP packet.

9. The method of claim 8, wherein the IP packet is relayed through a set of one or more switches.

10. The method of claim 9, further comprising:
    tracing through the set of one or more switches to identify the port on the switch to which the access point is connected using the source IP address determined from the received IP packet.

11. The method of claim 10, wherein one of the set of one or more switches is a last-hop switch, which sends the IP packet to the detector without relaying the IP packet through another switch, and wherein tracing through the set of one or more switches comprises:
    identifying a port on the last-hop switch that was used to send the IP packet to the detector using the source IP address;
    determining if the port on the last-hop switch is connected to another switch; and
    if the port is connected to another switch:
    a) identifying a port on that switch;
    b) determining if the port identified in a) is connected to yet another switch; and
    c) repeating a) and b) until a port is identified that is not connected to another switch, wherein the port that is not connected to another switch is the port on the switch that is connected to the access point.

12. The method of claim 6, further comprising:
    before the IP packet is sent from the detector to the access point through the wireless network, copying the wireless IP address of the detector into a data field of the IP packet; and
    when the IP packet is received at the detector, comparing the source IP address field of the IP packet to the wireless IP address in the data field of the IP packet, wherein if the source IP address field and the wireless IP address are the same, the IP packet was not network address translated, and wherein if the source IP address field and the wireless IP address are not the same, the IP packet was network address translated.

13. A system to trace an access point in a wireless network, the system comprising:
a detector associated with the access point through the wireless network, wherein the detector and the access point are connected through a private wired network, wherein the detector has a wireless internet protocol (IP) address and a wired IP address,
wherein the detector is configured to send an IP packet to the access point, wherein a source IP address field of the IP packet is set to the wireless IP address of the detector,
wherein a destination IP address field of the IP packet is set to the wired IP address of the detector, wherein the IP packet is routed from the access point back to the detector through a switch in the private wired network, and
wherein, when the IP packet is received at the detector, the detector is configured determine whether a source IP address used by the switch to send the IP packet to the detector through the private wired network is the wireless IP address of the detector; and
wherein the detector is configured to identify a port on the switch to route the IP packet back to the detector by analyzing a source IP address field from the received IP packet, if the source IP address is the wireless IP address of the detector.

14. The system of claim 13, further comprising:
a terminal connected to the detector, wherein the terminal is configured to:
determine the source IP addressed from the IP packet received at the detector; and
identify a port on the switch to which the access point is connected using the source IP address determined from the received IP packet.

15. The system of claim 14, whereon the switch comprises:
a set of one or more switches, wherein the IP packet is relayed through the set of one or more switches.

16. The system of claim 15, wherein the terminal is further configured to:
trace through the set of one or more switches to identify the port on the switch to which the access point is connected using the source IP address determined from the received IP packet.

17. The system of claim 16, wherein one of the set of one or more switches is a last-hop switch that sends the IP packet to the detector without being relayed through another switch, and wherein the terminal is configured to trace through the set of one or more switches by:
identifying a port on the last-hop switch that was used to send the IP packet to the detector using the source IP address;
determining if the port on the last-hop switch is connected to another switch; and
if the port is connected to another switch:
a) identifying a port on that switch;
b) determining if the port identified in a) is connected to yet another switch; and
c) repeating a) and b) until a port is identified that is not connected to another switch, wherein the port that is not connected to another switch is the port on the switch that is connected to the access point.

18. The system of claim 13, wherein the terminal is further configured to:

before the IP packet is sent from the detector to the access point through the wireless network, copy the wireless IP address of the detector into a data field of the IP packet; and when the IP packet is received at the detector, compare the source IP address field of the IP packet to the wireless IP address in the data field of the IP packet,
wherein if the source IP address field and the wireless IP address are the same, the IP packet was not network address translated, and wherein
if the source IP address field and the wireless IP address are not the same, the IP packet was network address translated.

19. A non-transitory computer-readable storage medium containing computer executable instructions to trace an access point in a wireless network, comprising instructions for:
setting a source internet protocol (IP) address field of an IP packet to a wireless IP address of a detector associated with the access point through the wireless network, wherein the detector and the access point are connected through a private wired network;
setting a destination IP address field of the IP packet to a wired IP address of the detector;
sending the IP packet from the detector to the access point through the wireless network, routing the IP packet from the access point back to the detector through a switch in the private wired network;
receiving the routed IP packet at the detector; and
determining whether a source IP address is the wireless IP address of the detector from the received IP packet;
identifying a port on the switch used to route the IP packet back to the detector by analyzing a source IP address field from the received IP packet, if the source IP address is the wireless IP address of the detector.

20. A method of tracing an access point in a wireless network, the method comprising:
a) locating access points in the wireless network using a detector, wherein the detector is connected to a private wired network controlled by a firewall;
b) identifying unauthorized access points among any access points located in a);
c) sending an internet protocol (IP) packet to an access point identified as an unauthorized access point in b) through the wireless network, wherein a source IP address field of the IP packet is set to a wireless IP address of the detector, and wherein a destination IP address field of the IP packet is set to a wired IP address of the detector;
d) if the IP packet is not returned to the detector through the private wired network connected to the detector, determining that the access point to which the IP packet was sent is not connected to the same private wired network as the detector, wherein the firewall prevents the IP packet from being returned to the detector; and
e) if the IP packet is returned to the detector through the private wired network connected to the detector, determining that the access point to which the IP packet was sent is connected to the same private wired network and is controlled by the same firewall as the detector.

21. The method of claim 20, further comprising:
if multiple access points are identified in b) as being unauthorized access points, performing c)-e) for each of the access points identified as being unauthorized access points.

22. The method of claim 20, wherein the detector is connected to a switch in the private wired network, and further comprising:
when the IP packet is returned to the detector through the private wired network in e), identifying a port on the switch used to send the IP packet to the detector.

23. The method of claim 22, further comprising:
determining a source IP address from the IP packet returned to the detector, wherein the port on the switch is identified using the determined source IP address.

24. The method of claim 20, further comprising:
when the IP packet is returned to the detector through the private wired network in e), determining if the IP packet was network address translated.

25. The method of claim 24, further comprising:
before sending the IP packet in c), copying the wireless IP address of the detector into a data field of the IP packet; and
when the IP packet is returned to the detector through the private wired network in e), determining a source IP address from the IP packet returned to the detector and comparing the source IP address determined from the returned IP packet to the wireless IP address in the data field of the returned IP packet,
wherein if the source IP address determined from the returned IP packet and the wireless IP address in the data field of the returned IP packet are different, the IP packet was network address translated.

26. A system to trace an access point in a wireless network, the system comprising:
a detector located in the wireless network, wherein the detector is connected to a private wired network controlled by a firewall,
wherein the detector is used to locate access points in the wireless network,
wherein unauthorized access points are identified among any access points located in the wireless network,
wherein the detector is used to send an internet protocol (IP) packet to an access point identified as an unauthorized access point through the wireless network,
wherein a source IP address field of the IP packet is set to a wireless IP address of the detector,
wherein a destination IP address field of the IP packet is set to a wired IP address of the detector,
wherein if the IP packet is not returned to the detector through the private wired network connected to the detector, the access point to which the IP packet was sent is determined to be not connected to the same private wired network and controlled by the same firewall as the detector, wherein the firewall prevents the IP packet from being returned to the detector, and
wherein if the IP packet is returned to the detector through the private wired network connected to the detector, the access point to which the IP packet was sent is determined to be connected to the same private wired network and is controlled by the same firewall as the detector.

27. The system of claim 20, wherein the detector is connected to a switch in the private wired network, and wherein, when the IP packet is returned to the detector through the private wired network, a port on the switch used to send the IP packet to the detector is identified.

28. The system of claim 27, wherein a source IP address is determined from the IP packet returned to the detector, and wherein the port on the switch is identified using the determined source IP address.

29. The system of claim 26, wherein, before the IP packet is sent, the wireless IP address of the detector is coped into a data field of the IP packet, wherein, when the IP packet is returned to the detector through the private wired network, a source IP address is determined from the IP packet returned to the detector and compared to the wireless IP address in the data field of the returned IP packet, and wherein if the source IP address determined from the returned IP packet and the wireless IP address in the data field of the returned IP packet are different, the IP packet was network address translated.

30. A non-transitory computer-readable storage medium containing computer executable instructions to trace an access point in a wireless network, comprising instructions for:
a) locating access points in the wireless network using a detector, wherein the detector is connected to a private wired network controlled by a firewall;
b) identifying unauthorized access points among any access points located in a);
c) sending an internet protocol (IP) packet to an access point identified as an unauthorized access point in b) through the wireless network, wherein a source IP address field of the IP packet is set to a wireless IP address of the detector, and wherein a destination IP address field of the IP packet is set to a wired IP address of the detector;
d) if the IP packet is not returned to the detector through the private wired network connected to the detector, determining that the access point to which the IP packet was sent is not connected to the same private wired network as the detector, wherein the firewall prevents the IP packet from being returned to the detector; and
e) if the IP packet is returned to the detector through the private wired network connected to the detector, determining that the access point to which the IP packet was sent is connected to the same private wired network and is controlled by the same firewall as the detector.

* * * * *